(12) United States Patent
Lewis et al.

(10) Patent No.: US 11,475,147 B2
(45) Date of Patent: Oct. 18, 2022

(54) IMPLEMENTING POLICY-BASED CONTAINER-LEVEL ENCRYPTION

(71) Applicant: International Business Machines Corporation, Armonk, NY (US)

(72) Inventors: Cecilia C. Lewis, San Jose, CA (US); Wayne E. Rhoten, Morgan Hill, CA (US); Eric D. Rossman, Wappingers Falls, NY (US); Mark A. Nelson, Poughkeepsie, NY (US); John C. Dayka, New Paltz, NY (US)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 15/900,596

(22) Filed: Feb. 20, 2018

(65) Prior Publication Data

US 2019/0258813 A1  Aug. 22, 2019

(51) Int. Cl.
*G06F 21/62* (2013.01)
*H04L 9/08* (2006.01)
*H04L 9/40* (2022.01)

(52) U.S. Cl.
CPC .......... *G06F 21/6218* (2013.01); *H04L 9/083* (2013.01); *H04L 9/088* (2013.01); *H04L 63/205* (2013.01)

(58) Field of Classification Search
CPC ..... G06F 21/6218; H04L 9/083; H04L 9/088; H04L 63/205
See application file for complete search history.

(56) References Cited

U.S. PATENT DOCUMENTS

| 8,397,083 | B1 * | 3/2013 | Sussland | H04L 67/1097 |
| | | | | 380/277 |
| 8,572,757 | B1 * | 10/2013 | Stamos | H04L 63/04 |
| | | | | 726/28 |
| 8,631,460 | B2 | 1/2014 | Shea et al. | |
| 8,645,715 | B2 | 2/2014 | Dawson et al. | |
| 9,026,805 | B2 | 5/2015 | Acar et al. | |
| 9,553,720 | B2 | 1/2017 | Rich et al. | |
| 9,798,899 | B1 | 10/2017 | Takahashi | |
| 9,954,835 | B2 | 4/2018 | Brown et al. | |

(Continued)

OTHER PUBLICATIONS

Mell et al., "The NIST Definition of Cloud Computing," NIST Special Publication 800-145, Sep. 2011, 7 pages.

(Continued)

*Primary Examiner* — Saleh Najjar
*Assistant Examiner* — Devin E Almeida
(74) *Attorney, Agent, or Firm* — Zilka-Kotab, P.C.

(57) ABSTRACT

A computer-implemented method according to one embodiment includes identifying a creation of a container within a system, selecting a security policy for the container, based on one or more attributes, identifying a key label associated with the security policy for the container, retrieving a data encryption key, utilizing the key label, and encrypting the container, utilizing the data encryption key. This may enable a highly granular level of automatic container-level security within the system that may be transparently implemented within the system, which may streamline container security and reduce an amount of stored data and processing necessary for implementing container security, and may thereby improve the performance of the system.

22 Claims, 8 Drawing Sheets

(56) References Cited

U.S. PATENT DOCUMENTS

| | | | |
|---|---|---|---|
| 10,078,656 | B1 | 9/2018 | Carl |
| 10,372,555 | B1* | 8/2019 | Troyan ................ G06F 11/1469 |
| 11,095,652 | B2 | 8/2021 | Lewis et al. |
| 2003/0120949 | A1* | 6/2003 | Redlich ............ C07K 14/70575 726/21 |
| 2004/0123109 | A1 | 6/2004 | Choi |
| 2008/0022370 | A1* | 1/2008 | Beedubail ............ H04L 63/102 726/4 |
| 2008/0162482 | A1* | 7/2008 | Ahern ................ G06F 21/6218 |
| 2009/0268903 | A1* | 10/2009 | Bojinov ................ G06F 3/0622 380/45 |
| 2010/0208898 | A1 | 8/2010 | Acar et al. |
| 2011/0231900 | A1* | 9/2011 | Shimoe ................ G06F 21/604 726/1 |
| 2011/0271103 | A1 | 11/2011 | Shur et al. |
| 2013/0179495 | A1* | 7/2013 | Eom .................... G06F 21/6218 709/203 |
| 2014/0026204 | A1 | 1/2014 | Buntinx |
| 2014/0258719 | A1* | 9/2014 | Cidon .................... G06F 16/182 713/165 |
| 2016/0072772 | A1 | 3/2016 | Geigel et al. |
| 2016/0142387 | A1* | 5/2016 | Lockhart ............. H04L 63/061 713/171 |
| 2016/0283406 | A1* | 9/2016 | Linga .................. G06F 21/6272 |
| 2017/0041296 | A1 | 2/2017 | Ford et al. |
| 2017/0324566 | A1 | 11/2017 | Kawasaki et al. |
| 2017/0359370 | A1* | 12/2017 | Humphries ............. H04L 63/10 |
| 2018/0007059 | A1* | 1/2018 | Innes .................. G06F 21/6218 |
| 2018/0060361 | A1 | 3/2018 | Beveridge |
| 2018/0109501 | A1* | 4/2018 | Pawgi ................ H04L 63/0428 |
| 2018/0113730 | A1* | 4/2018 | Pearson ............. G06F 9/45558 |
| 2018/0212940 | A1 | 7/2018 | Novak |
| 2018/0227122 | A1* | 8/2018 | Gupta .................. H04L 9/0869 |
| 2018/0343118 | A1 | 11/2018 | Funayama |
| 2019/0005062 | A1* | 1/2019 | Joneja ............. G06F 16/113 |
| 2019/0068363 | A1* | 2/2019 | Rudzitis ................ H04L 9/0891 |
| 2019/0258778 | A1* | 8/2019 | Park ...................... H04L 63/062 |
| 2019/0258813 | A1* | 8/2019 | Lewis ................ G06F 21/6209 |
| 2019/0260753 | A1 | 8/2019 | Lewis et al. |
| 2019/0342079 | A1* | 11/2019 | Rudzitis .................. H04L 9/083 |

OTHER PUBLICATIONS

Mell, et al., "The NIST Definition of Cloud Computing," Information Page, Version 15, Oct. 7, 2009, 2 pages.

NIST, "NIST Cloud Computing Program," Information Technology Laboratory webpage, last updated Nov. 13, 2013, 3 pages.

Demchenko et al., "Big Security for Big Data: Addressing Security Challenges for the Big Data Infrastructure," Secure Data Management Workshop Part of VLDB2013 Conference, Aug. 30, 2013, pp. 1-19.

Ren, K. "Secure access to outsourced data," Presentation, University at Buffalo The State University of New York, 2013, pp. 1-66.

Alias et al., "Improve Security of Attribute Based Encryption for Secure Sharing of Personal Health Records," International Journal of Computer Science and Information Technologies, vol. 5, No. 5, 2014, pp. 6315-6317.

Wang et al. "High availability storage system based on two-level metadata management," Frontier of Computer Science and Technology, 2007, pp. 1-8.

Xue et al., "MDS Functionality Analysis," Dec. 4, 2001, pp. 1-19.

D'Acquisto et al., "Privacy by design in big data: An overview of privacy enhancing technologies in the era of big data analytics," Enisa, Dec. 2015, 80 pages.

Nguyen et al., "A Provenance-based Access Control Model for Dynamic Separation of Duties," Eleventh Annual International Conference on Privacy, Security and Trust, IEEE, 2013, pp. 247-256.

Sandhu et al., "Role-Based Access Control Models," IEEE Computer, vol. 29, No. 2, Feb. 1996, 22 pages.

Barkley, J., "Comparing Simple Role Based Access Control Models and Access Control Lists," Proceedings of the second ACM workshop on Role-based access control, 1997, pp. 127-132.

Moyer et al. "Generalized Role-Based Access Control," IEEE International Conference on Distributed Computing Systems, 2001, pp. 391-398.

Humphreys, "Information security management standards: Compliance, governance and risk management," Information Security Technical Report, vol. 13, 2008, pp. 247-255.

Lewis et al., U.S. Appl. No. 15/900,614, filed Feb. 20, 2018.

List of IBM Patents Or Patent Applications Treated As Related.

IBM, "Encryption Facility for z/OS," 2018, pp. 1-5 retrieved from https://www-03.ibm.com/systems/z/os/zos/tools/encryption_facility/.

Voltage, "Data Security Products," 2017, pp. 1-6 retrieved from https://www.voltage.com/products/data-security/.

Voltage, "Enterprise Security Key Management," 2017, pp. 1-3 retrieved from https://www.voltage.com/products/eskm/.

Voltage, "Atalla Hardware Security Module (HSM)," 2017, pp. 1-9 retrieved from https://www.voltage.com/atalla-hardware-security-module-hsm/.

Voltage, "Email Security Products," 2017, pp. 1-5 retrieved from https://www.voltage.com/products/email-security/.

Non-Final Office Action from U.S. Appl. No. 15/900,614, dated Dec. 26, 2019.

Non-Final Office Action from U.S. Appl. No. 15/900,614, dated Jun. 9, 2020.

Final Office Action from U.S. Appl. No. 15/900,614, dated Oct. 22, 2020.

Notice of Allowance from U.S. Appl. No. 15/900,614, dated Apr. 12, 2021.

* cited by examiner

IMPLEMENTING POLICY-BASED CONTAINER-LEVEL ENCRYPTION

BACKGROUND

The present invention relates to data encryption, and more specifically, this invention relates to encrypting data at a container level within a system.

Encryption plays a vital role in protecting digital assets which may contain sensitive information. However, many organizations struggle with implementing this practice to fully secure their data. Organizations understand that relying on disk or tape hardware level encryption may not be sufficient to protect their data, especially due to growing concerns over insider threats and malicious employees. In addition, to support regulatory compliance, organizations have been spending resources on modifying applications to incorporate encryption to secure sensitive data residing in files, and in some cases, on vendor products that perform such function. This can be very costly in terms of skill, complexity, CPU overhead, etc. Organizations require a more secure, cost effective approach to protecting their digital assets. There is therefore a need to transparently implement container-level encryption in order to ensure that only appropriate sources are able to access sensitive data.

SUMMARY

A computer-implemented method according to one embodiment includes identifying a creation of a container within a system, selecting a security policy for the container, based on one or more attributes, identifying a key label associated with the security policy for the container, retrieving a data encryption key, utilizing the key label, and encrypting the container, utilizing the data encryption key. This may enable a highly granular level of automatic container-level security within the system that may be transparently implemented within the system, which may streamline container security and reduce an amount of stored data and processing necessary for implementing container security, and may thereby improve the performance of the system.

According to another embodiment, the security policy includes a key label that is associated with a unique, predetermined data encryption key that is used to encrypt the container using one or more encryption procedures.

According to another embodiment, the key label is stored as metadata within the container. In this way, the key label may not be affected by changing security policies after the creation of the container.

According to another embodiment, a computer program product for implementing policy-based container-level encryption comprises a computer readable storage medium having program instructions embodied therewith, where the computer readable storage medium is not a transitory signal per se, and where the program instructions are executable by a processor to cause the processor to perform a method comprising identifying a creation of a container within a system, utilizing the processor, selecting a security policy for the container, based on one or more attributes, utilizing the processor, identifying a key label associated with the security policy for the container, utilizing the processor, retrieving, utilizing the processor, a data encryption key, utilizing the key label, and encrypting, utilizing the processor, the container, utilizing the data encryption key. This may enable a highly granular level of automatic container-level security within the system that may be transparently implemented within the system.

A system according to another embodiment includes a processor, and logic integrated with the processor, executable by the processor, or integrated with and executable by the processor, where the logic is configured to identify a creation of a container within a system, select a security policy for the container, based on one or more attributes, identify a key label associated with the security policy for the container, retrieve a data encryption key, utilizing the key label, and encrypt the container, utilizing the data encryption key. This may enable a highly granular level of automatic container-level security within the system that may be transparently implemented within the system.

A computer-implemented method according to another embodiment includes receiving a request to define a security policy within a system, receiving one or more attributes associated with the security policy, receiving a key label associated with the security policy, and storing the security policy in association with the one or more attributes and the key label. This may enable the creation of a security policy that may be automatically and transparently implemented within the system.

A computer-implemented method according to another embodiment includes identifying a creation of a container within a system, selecting a security policy for the container, based on one or more attributes associated with the container, one or more attributes associated with a user who requested the creation of the container, and one or more attributes associated with an environment associated with the container, identifying a key label associated with the security policy for the container, storing the key label as metadata within the container, sending a request including the key label to a key repository, receiving a data encryption key from the key repository in response to the request, and encrypting the container, utilizing the data encryption key. This may enable a highly granular level of automatic container-level security within the system that may be transparently implemented within the system.

Other aspects and embodiments of the present invention will become apparent from the following detailed description, which, when taken in conjunction with the drawings, illustrate by way of example the principles of the invention.

DETAILED DESCRIPTION

Figure 1:
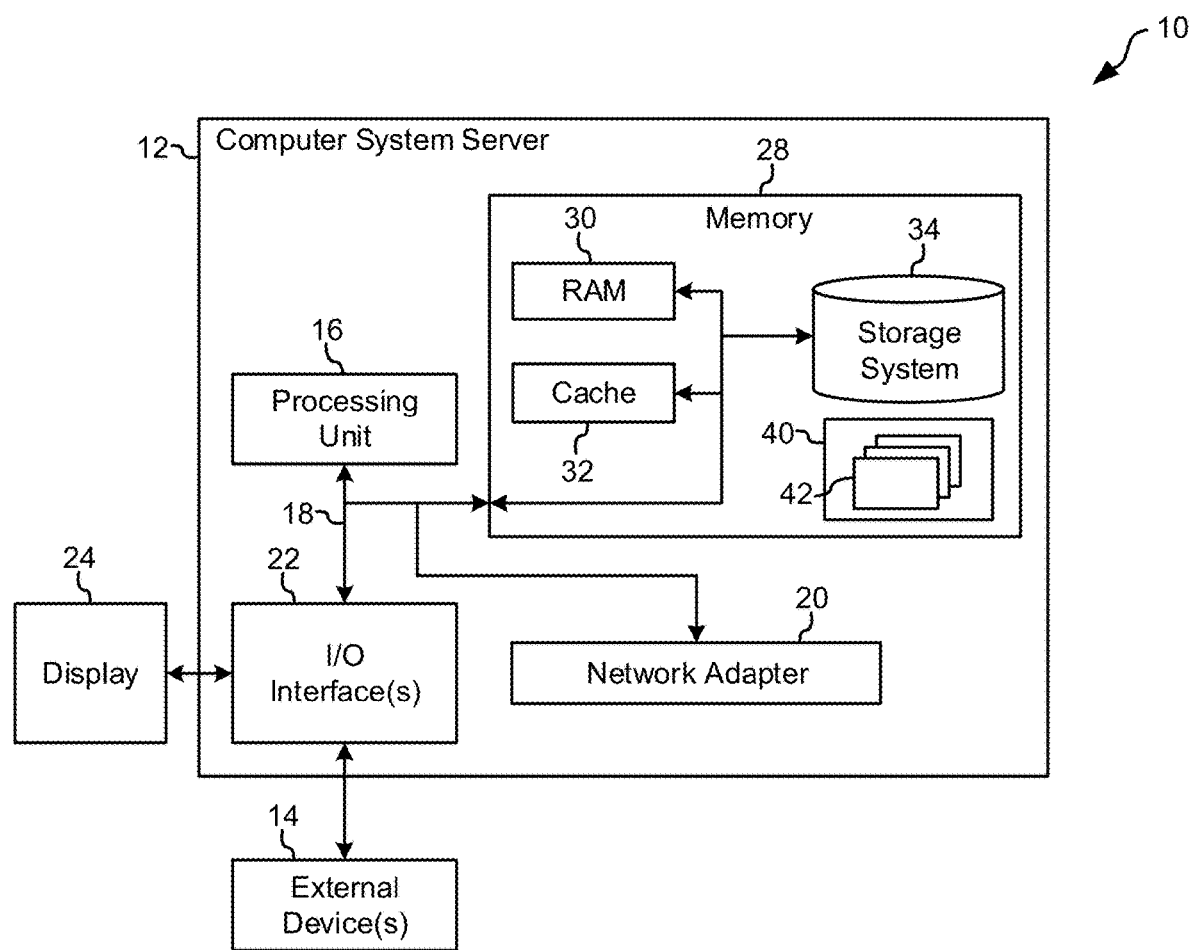
FIG. 1 depicts a cloud computing node according to an embodiment of the present invention.

The following description discloses several preferred embodiments of systems, methods and computer program products for implementing policy-based container-level encryption. Various embodiments provide a method for encrypting and decrypting containers utilizing encryption keys retrieved utilizing key labels associated with the containers.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for implementing policy-based container-level encryption.

In one general embodiment, a computer-implemented method includes identifying a creation of a container within a system, selecting a security policy for the container, based on one or more attributes, identifying a key label associated with the security policy for the container, retrieving a data encryption key, utilizing the key label, and encrypting the container, utilizing the data encryption key. This may enable a highly granular level of automatic container-level security within the system that may be transparently implemented within the system, which may streamline container security and reduce an amount of stored data and processing necessary for implementing container security, and may thereby improve the performance of the system.

In another general embodiment, the security policy includes a key label that is associated with a unique, predetermined data encryption key that is used to encrypt the container using one or more encryption procedures.

In another general embodiment, the key label is stored as metadata within the container. In this way, the key label may not be affected by changing security policies after the creation of the container.

In another general embodiment, a computer program product for implementing policy-based container-level encryption comprises a computer readable storage medium having program instructions embodied therewith, where the computer readable storage medium is not a transitory signal per se, and where the program instructions are executable by a processor to cause the processor to perform a method comprising identifying a creation of a container within a system, utilizing the processor, selecting a security policy for the container, based on one or more attributes, utilizing the processor, identifying a key label associated with the security policy for the container, utilizing the processor, retrieving, utilizing the processor, a data encryption key, utilizing the key label, and encrypting, utilizing the processor, the container, utilizing the data encryption key. This may enable a highly granular level of automatic container-level security within the system that may be transparently implemented within the system.

In another general embodiment, a system includes a processor, and logic integrated with the processor, executable by the processor, or integrated with and executable by the processor, where the logic is configured to identify a creation of a container within a system, select a security policy for the container, based on one or more attributes, identify a key label associated with the security policy for the container, retrieve a data encryption key, utilizing the key label, and encrypt the container, utilizing the data encryption key. This may enable a highly granular level of automatic container-level security within the system that may be transparently implemented within the system.

In another general embodiment, a computer-implemented method includes receiving a request to define a security policy within a system, receiving one or more attributes associated with the security policy, receiving a key label associated with the security policy, and storing the security policy in association with the one or more attributes and the key label. This may enable the creation of a security policy that may be automatically and transparently implemented within the system.

In another general embodiment, a computer-implemented method includes identifying a creation of a container within a system, selecting a security policy for the container, based on one or more attributes associated with the container, one or more attributes associated with a user who requested the creation of the container, and one or more attributes associated with an environment associated with the container, identifying a key label associated with the security policy for the container, storing the key label as metadata within the container, sending a request including the key label to a key repository, receiving a data encryption key from the key repository in response to the request, and encrypting the container, utilizing the data encryption key. This may enable a highly granular level of automatic container-level security within the system that may be transparently implemented within the system.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
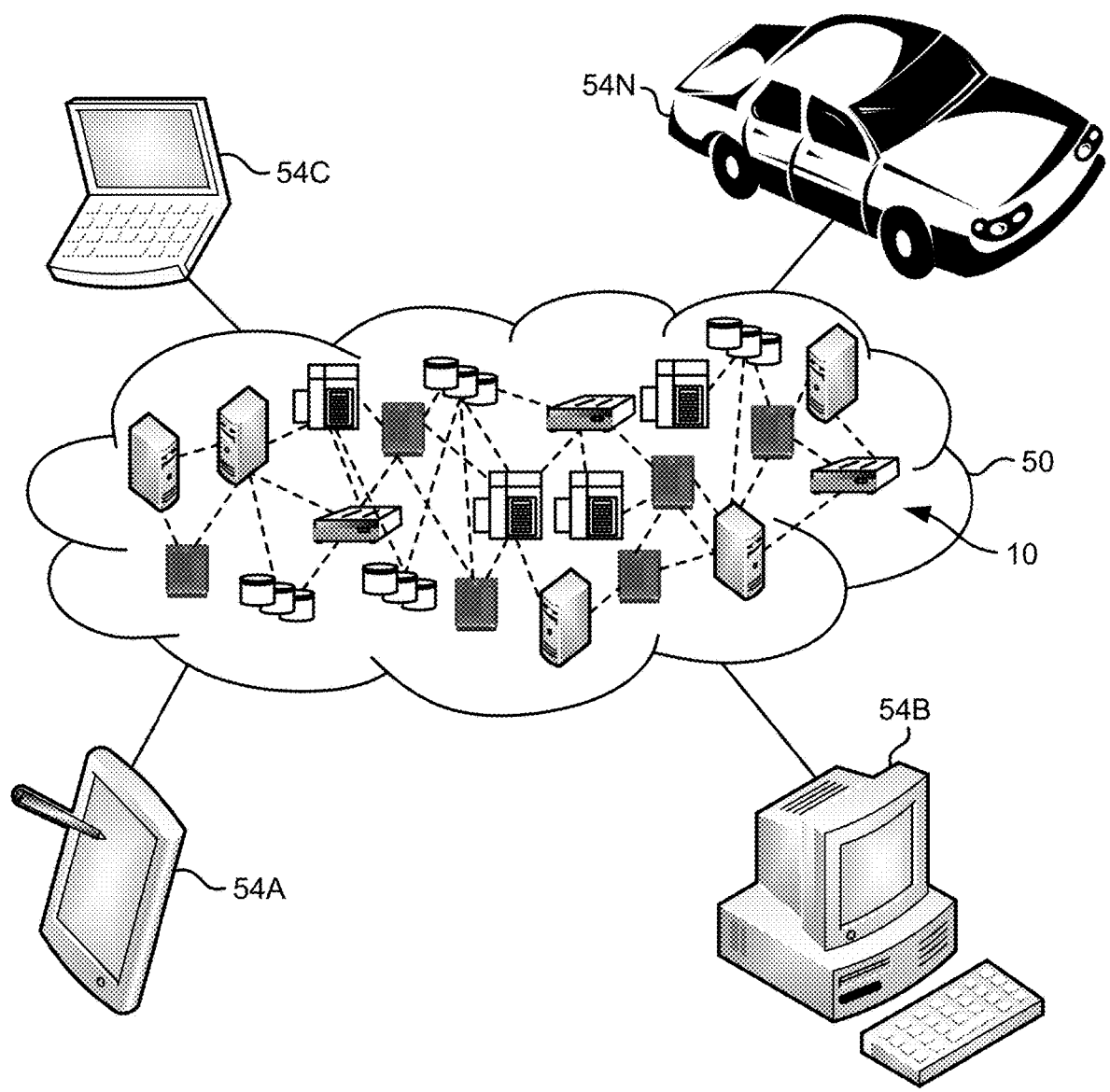
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
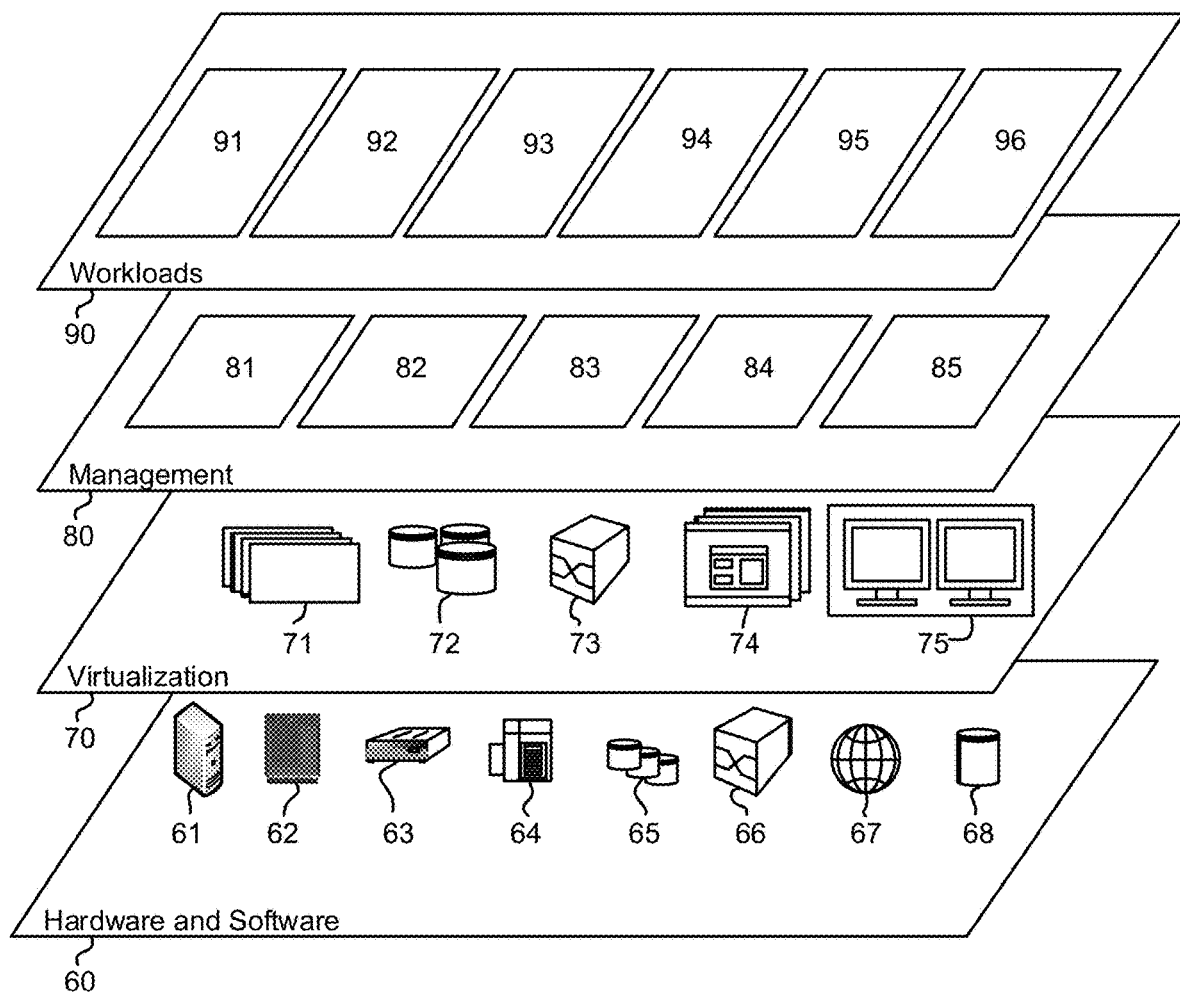
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data storage and management 96.

Figure 4:
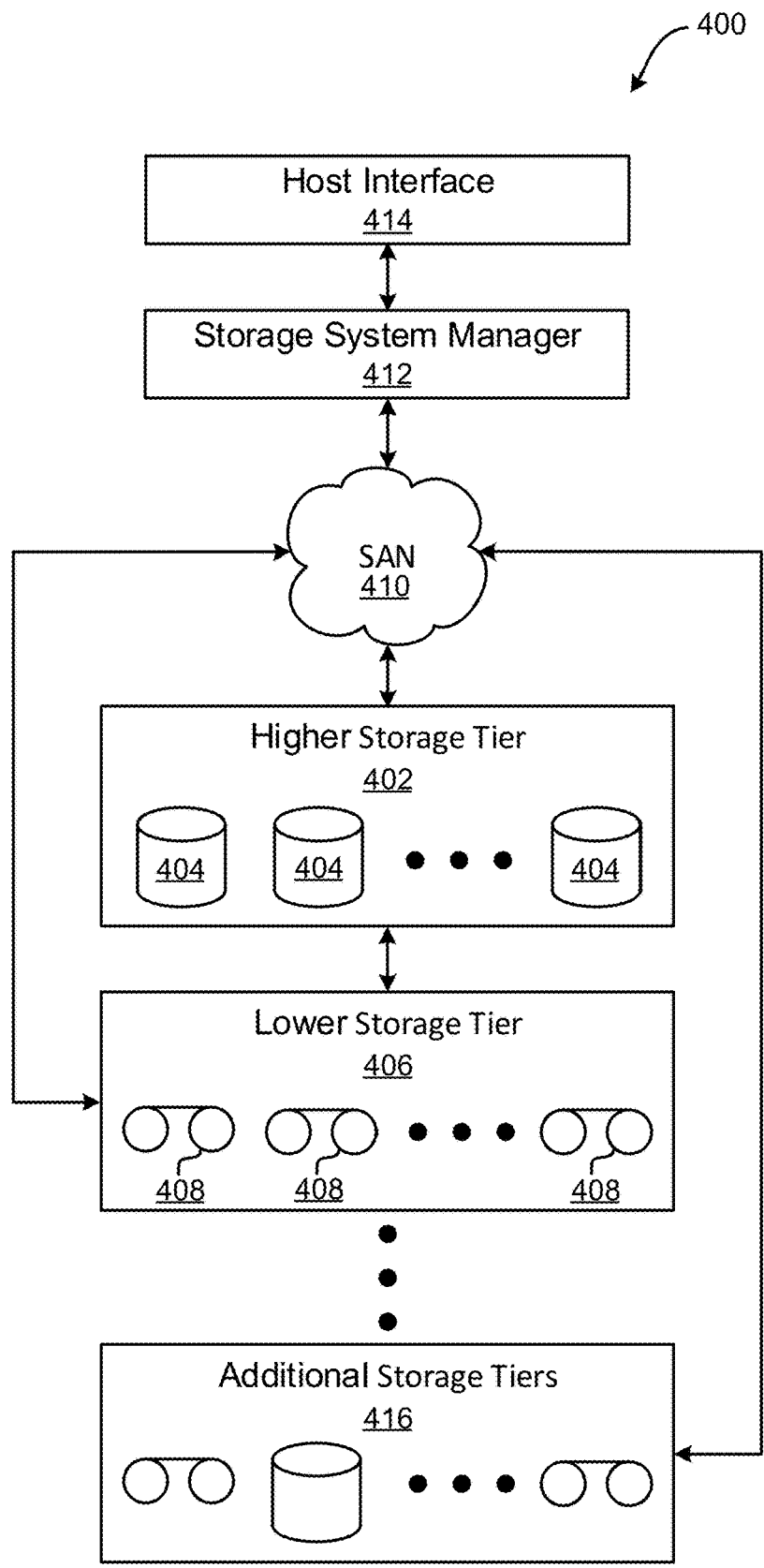
FIG. 4 illustrates a tiered data storage system in accordance with one embodiment.

Now referring to FIG. 4, a storage system 400 is shown according to one embodiment. Note that some of the elements shown in FIG. 4 may be implemented as hardware and/or software, according to various embodiments. The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including sequential access media such as magnetic tape in tape drives and/or optical media, slower accessing HDDs, slower accessing SSDs, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a storage area network (SAN), as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 402, may include a majority of SSD storage media for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

According to some embodiments, the storage system (such as 400) may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
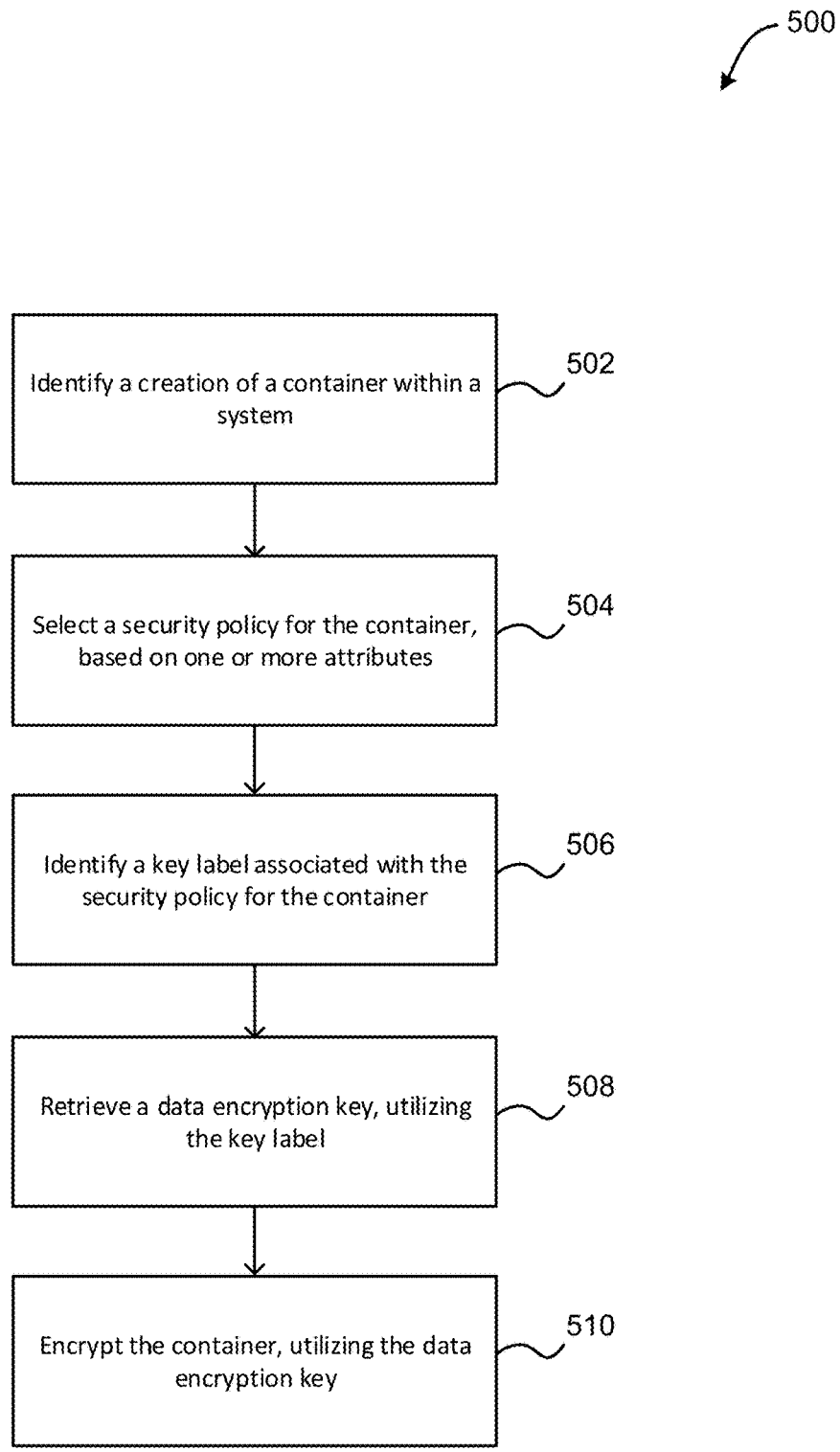
FIG. 5 illustrates a flowchart of a method for implementing policy-based container-level encryption, in accordance with one embodiment.

Now referring to FIG. 5, a flowchart of a method 500 is shown according to one embodiment. The method 500 may be performed in accordance with the present invention in any of the environments depicted in FIGS. 1-4 and 8, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a creation of a container within a system is identified. In one embodiment, the container may include a self-contained piece of information (such as a file, a data set, a log, a database, a table space, etc.). In another embodiment, the creation of the container may include the definition of the container within the system (e.g., within an environment manager of the system, etc.). In yet another embodiment, the system may implement an environment manager (e.g., an operating system, a virtual environment such as a virtual machine, a kernel, etc.). For example, the environment manager may manage the creation of the container within the system.

Additionally, in one embodiment, the container may be created in response to a request from a user. For example, the user may submit a definition of the container within the system (e.g., utilizing one or more interfaces such as a graphical user interface (GUI), etc.). In another embodiment, the container may be created in response to an automatic request from an application. For example, the application may define the container while running within (or externally from) the system.

Further, in one embodiment, the system may include a computing device such as a server, a desktop computer, a mobile computing device, etc. In another embodiment, the system may include a cloud computing environment.

Further still, method 500 may proceed with operation 504, where a security policy is selected for the container, based on one or more attributes. In one embodiment, the one or more attributes may be associated with the container. For example, the one or more attributes may include a name of the container, a size of the container, a type of the container, a date that the container was created, a location where the container was created, a sensitivity level of the container, etc.

Also, in one embodiment, the one or more attributes may be associated with a user that requested the creation of the container. For example, the one or more attributes may include a name of the user requesting the creation of the container, an authorization level of the user, an account number of the user, a department number of the user, a physical location of the user, etc. In another embodiment, the security policy may be selected only if the user has a predetermined security authorization level, predetermined security privileges, etc.

In addition, in one embodiment, the one or more attributes may be associated with an environment associated with the container. For example, the one or more attributes may include an amount of available storage space within the system, a current security level being implemented within the system, one or more business requirements associated with the system, etc. In another embodiment, the security policy may include an indication of a level of security to implement for the container. In this way, the security policy may be dynamically selected for the container, utilizing the one or more attributes. This may eliminate a need for the system to implement manual security protocols for containers, which may therefore improve a performance of the system.

Furthermore, method 500 may proceed with operation 506, where a key label associated with the security policy for the container is identified. In one embodiment, the security policy may be associated with a predetermined type of encryption to be implemented for the container. In another embodiment, the predetermined type of encryption may be determined by a security administrator separate from a system administrator.

Further still, in one embodiment, the security policy may include a key label that is associated with a unique, predetermined data encryption key, where the data encryption key is used to encrypt the container using one or more encryption procedures. In another embodiment, the key label may be stored in association with the container. For example, the key label may be stored as metadata within the container. In this way, the key label may not be affected by changing security policies after the creation of the container. This may reduce an amount of processing needed to update security for individual containers after security policies have been changed, which may improve the operation of a computer implementing such security policies.

Also, method 500 may proceed with operation 508, where a data encryption key is retrieved, utilizing the key label. In one embodiment, the key label may be cross-referenced at a key repository to obtain the data encryption key. In another embodiment, the key repository may include a plurality of different key labels, where each key label is associated with a different, unique data encryption key (e.g., utilizing a pointer, etc.). In yet another embodiment, a request including the key label may be sent to the key repository, and the key repository may return the data encryption key in response to the request.

Additionally, method 500 may proceed with operation 510, where the container is encrypted, utilizing the data encryption key. In one embodiment, the data encryption key may be associated with a specific encryption method, and the container may be encrypted utilizing the specific encryption method and the data encryption key. In another embodiment, the data encryption may be performed automatically. For example, the data encryption may be performed automatically and transparently by an environment manager of the system.

In this way, the container may be automatically encrypted according to the security policy. Additionally, a highly granular level of automatic container-level security may be enabled within the system that is transparently implemented by a security administrator of the system. This may enable the ability to define security policies to assign encryption keys unique to data to be protected and to ensure that only the appropriate users are able to access sensitive data. The use of security policies and key labels may also streamline container security and reduce an amount of stored data and processing necessary for implementing container security, which may improve the performance of a system implementing container security. Additionally, the security of the system may be increased when compared to prior methods, which may reduce instances of performance-hindering security violations and may therefore increase a performance of a system implementing container security.

Figure 6:
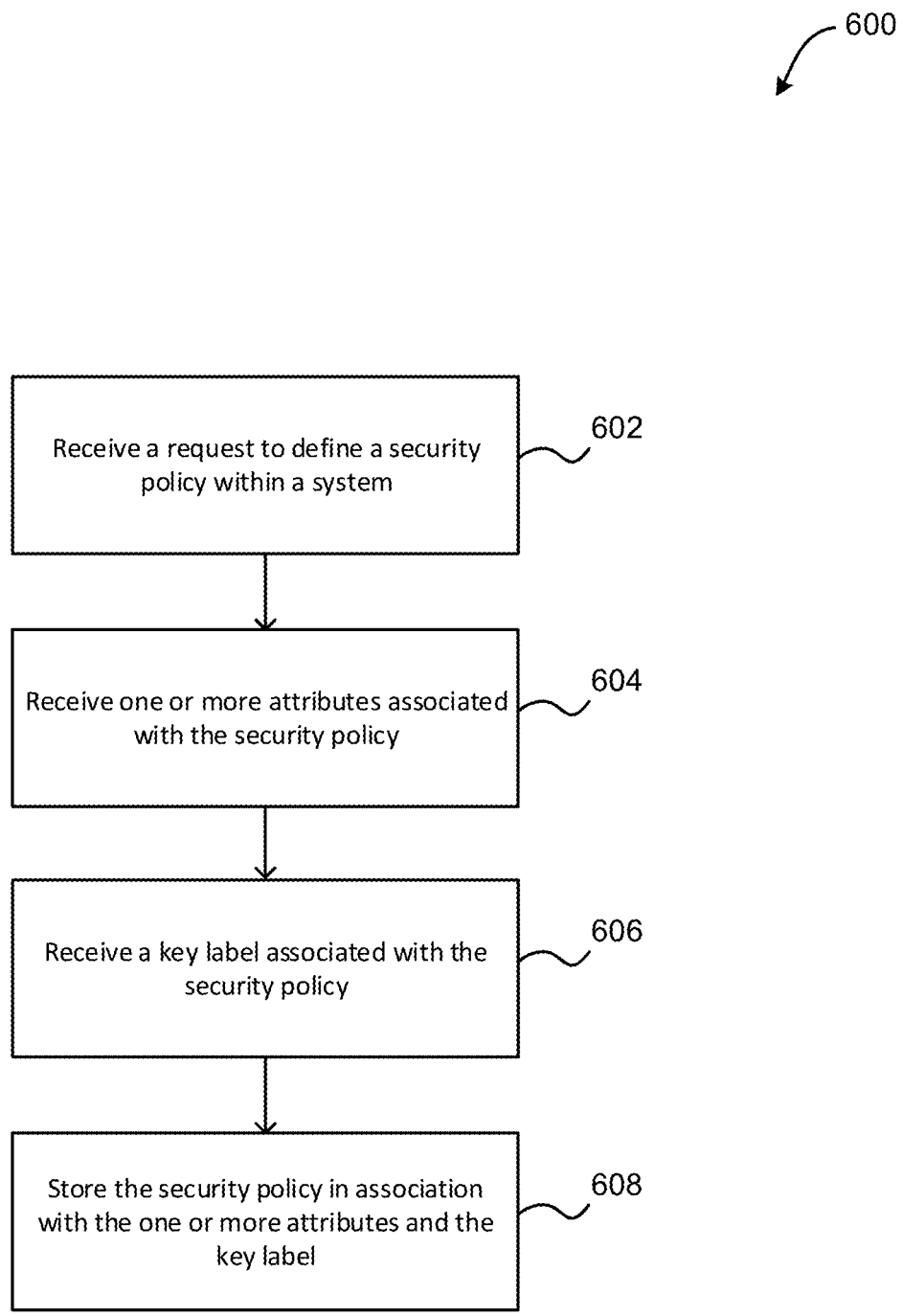
FIG. 6 illustrates a flowchart of a method for creating a security policy, in accordance with one embodiment.

Now referring to FIG. 6, a flowchart of a method 600 for creating a security policy is shown according to one embodiment. The method 600 may be performed in accordance with the present invention in any of the environments depicted in FIGS. 1-4 and 8, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 may initiate with operation 602, where a request to define a security policy within a system is identified. In one embodiment, the request may include receipt of a predetermined command by an environment manager of the system. Additionally, method 600 may proceed with operation 604, where one or more attributes associated with the security policy are received. In one embodiment, the one or more attributes may include attributes associated with the container, with a user who requested the definition of the security policy, with an environment associated with the container, etc.

Further, in one embodiment, the one or more attributes may include an indication of one or more types of containers to which the security policy applies. In another embodiment, the one or more attributes may identify a single container, a plurality of containers, etc. For example, the one or more attributes may identify a plurality of containers associated with a predetermined application.

Further still, method 600 may proceed with operation 606, where a key label associated with the security policy is received. In one embodiment, the key label may refer to a unique encryption key. In another embodiment, a unique encryption key may only be used to encrypt and decrypt containers indicated within the security policy.

Also, method 600 may proceed with operation 608, where the security policy is stored in association with the one or more attributes and the key label. In one embodiment, the security policy may be stored in an encryption key repository. In another embodiment, the key label may be linked to security policy and the one or more attributes (e.g., via one or more pointers, etc.).

In yet another embodiment, the security policy may add the key label to all containers that have the one or more attributes. In still another embodiment, the security policy may implement the encryption and decryption of containers, utilizing a data encryption key associated with the key label, in response to adding the key label to the containers.

In addition, in one embodiment, a command to define a security policy may be received from a user, where the command includes a key label parameter and defined criteria associated with one or more containers. In response to receiving the command, a security policy may be created that adds the key label indicated by the key label parameter to containers that meet the defined criteria.

For example, within a z/OS operating system, a RACF command ALTDSD may be used to define a security policy which associates the key label 'PROJECTA-KEY1' to containers whose names begin with 'PROJECT.DATA.' An example command may include:

ALTDSD 'PROJECTA.DATA.*'UACC(NONE) DFP (RESOWNER(iduser1) DATAKEY(PROJECTA-KEY1))

In this way, a key assignment policy may be tied to security definitions, which may in turn be tied to business requirements. For example, containers of a certain type or containers created by a certain department or with a certain account number may be forced to be encrypted. This may be accomplished by allowing the key label for a new container to be obtained from a security policy defined and maintained by a security product, which is managed by a security administrator, to meet an organization's security requirements.

Additionally, a key assignment policy may be established at a level of granularity determined by a security policy. This may be accomplished by allowing the flexibility of specifying a key label in the security policy that can be as granular as required to meet an organization's security objectives. For example, the policy may implement a single key label per container, a single key label for all containers, a single key label for all containers associated with a specific application, etc. This may be as granular as needed to adhere to the security policy.

Figure 7:
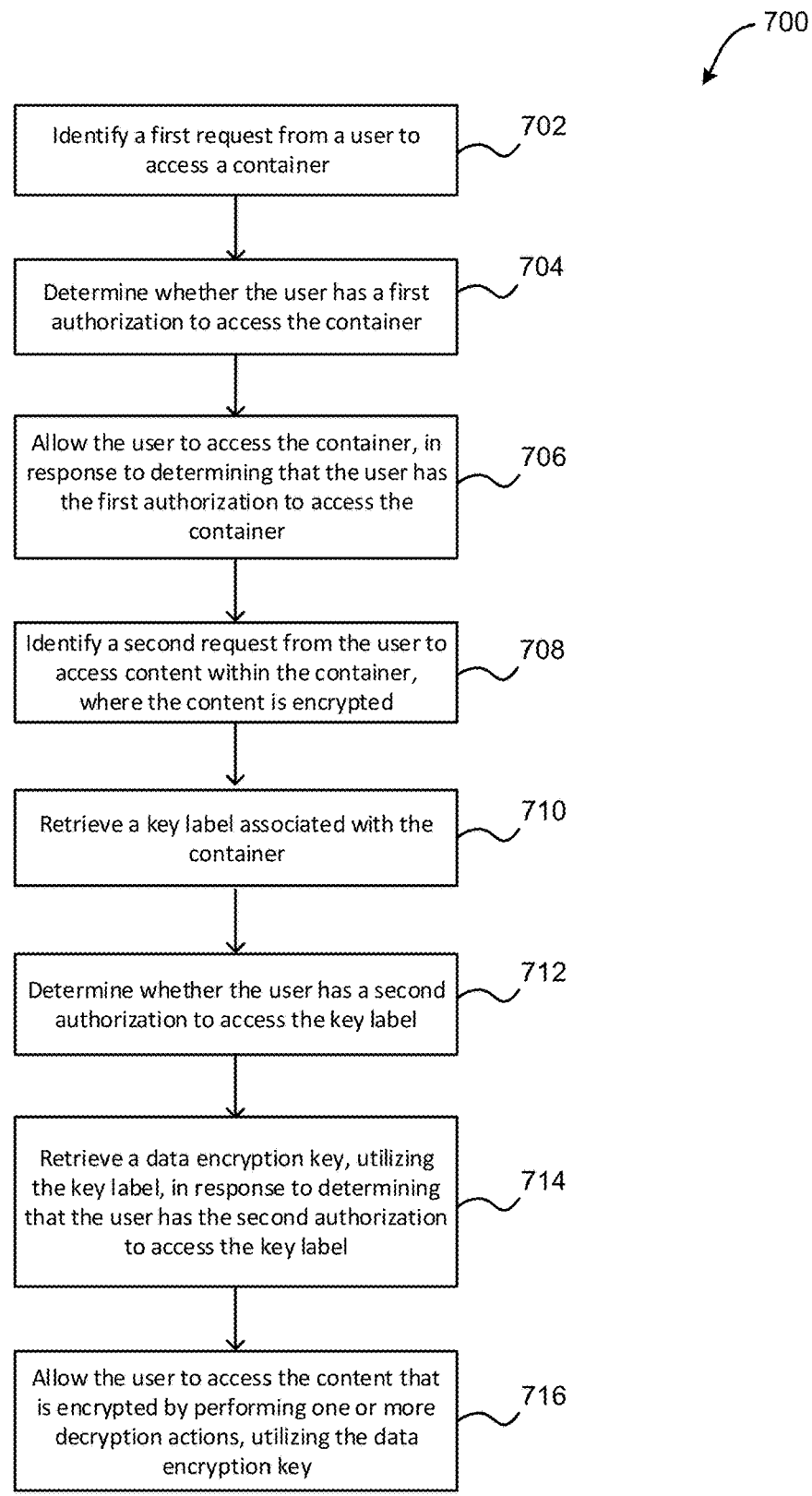
FIG. 7 illustrates a flowchart of a method for implementing a separation of duties for container security, in accordance with one embodiment

Now referring to FIG. 7, a flowchart of a method 700 for implementing a separation of duties for container security is shown according to one embodiment. The method 700 may be performed in accordance with the present invention in any of the environments depicted in FIGS. 1-4 and 8, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a first request to access a container is received from a user. In one embodiment, the first request may include a request to access the container in order to perform one or more actions involving the container. In another embodiment, the first request may include a request by a storage administrator to perform a migration that includes the container, a request to perform a backup that includes the container, a request to perform a replication that includes the container, etc.

Additionally, method 700 may proceed with operation 704, where it is determined whether the user has a first authorization to access the container. In one embodiment, the determining may include comparing an identifier associated with the user to a list of identifiers that have the first authorization. In another embodiment, a security manager may determine whether the user has the first authorization to access the container. In yet another embodiment, first authorization may be associated with only an access to the container, and not access to the content of the container. For example, the first authorization may enable access to encrypted content of the container, and a second authorization different from the first authorization may enable access to decrypted content of the container (e.g., as clear text, etc.).

Further, in one embodiment, the first authorization and the second authorization may be managed (e.g., assigned, revoked, etc.) by a security administrator separate from the system administrator. In yet another embodiment, the system administrator may not be able to adjust or override the first authorization or the second authorization.

Further still, method 700 may proceed with operation 706, where the user is allowed to access the container, in response to determining that the user has the first authorization to access the container. In one embodiment, access to the container by the user may be denied in response to determining that the user does not have the first authorization to access the container.

Also, method 700 may proceed with operation 708, where a second request to access content within the container is received from the user, where the content is encrypted. In one embodiment, the second request may include a request to access the content of the container (e.g., as clear text, etc.) in order to perform one or more actions on the content. For example, the second request may include a request to edit the content of the container, a request to view the content of the container, a request to delete the content of the container, etc. In another embodiment, the second request may be received from the user after it is determined that the user has the first authorization to access the container, and is allowed access to the container.

In addition, method 700 may proceed with operation 710, where a key label associated with the container is retrieved. In one embodiment, the key label may be stored as unencrypted metadata within the container, in association with the container, etc. In another embodiment, the key label may be created and assigned to the container in response to the creation of the container within a system, according to a security policy set by a security administrator, where a system administrator may not be able to adjust or override the key label assigned to the container in the security policy.

Also, in one embodiment, the key label associated with the container may be specified within a security policy for the container by a security administrator separate from a system administrator, where the security administrator is able to modify or delete the key label associated with the container, and the system administrator is not able to specify, modify, or delete the key label associated with the container. In this way, system administrators (as well as storage administrators) may not be able to affect the key label specified on the security policy associated with the container.

Furthermore, method 700 may proceed with operation 712, where it is determined whether the user has a second authorization to access the key label. In one embodiment, the determining may include comparing an identifier associated with the user to a list of identifiers that have the second authorization. In another embodiment, a security manager may be invoked to determine whether the user has the second authorization to access the key label.

Further still, method 700 may proceed with operation 714, where a data encryption key is retrieved, utilizing the key label, in response to determining that the user has the second authorization to access the key label. In one embodiment, the data encryption key may not be retrieved, and an error may be returned, in response to determining that the user does not have the second authorization to access the key label. In another embodiment, the key label may be cross-referenced at a key repository to obtain the data encryption key. For example, the key repository may include a plurality of different key labels, where each key label is associated with a different, unique data encryption key (e.g., utilizing a pointer, etc.).

Also, in one embodiment, a request including the key label may be sent to the key repository, and the key repository may return the data encryption key in response to the request. In another embodiment, the data encryption key may only be used to encrypt and decrypt content of the container, according to a security policy.

Additionally, method 700 may proceed with operation 716, where the user is allowed to access the content that is encrypted by performing one or more decryption actions, utilizing the data encryption key. In one embodiment, the encrypted content may be decrypted, utilizing the data encryption key. In another embodiment, the decrypted content may then be made accessible to the user.

In this way, a differentiation between access to a container and access to content of the container may be enabled and enforced. This may be accomplished by requiring that any user who attempts to open a container (e.g., to read or write it, etc.) must, in addition to having authorization to the container, also have authorization to the key label. As a result, the data owner, who must have access the content of the container (e.g., as clear text, etc.), must also have authorization to the key label. In another embodiment, a system or storage administrator, who may need to only process the container (e.g., for backup, migration, replication, etc.) may not be given authorization to the key label, and therefore may not have access to the content of the container. This may limit the users who are able to access sensitive data within a container.

For example, a storage administrator having a first authorization may perform functions such as performing a migration that includes the container, performing a backup that includes the container, and performing a replication. However, the storage administrator may not access data of the container in clear text because they may not have the second authorization. The data owner may have both the first authorization and the second authorization, and may therefore access the data of the container in clear text. In this way, separation of duties between storage (and system) administrators and data owners may be implemented.

In another example, within a z/OS operating system, a RACF command PERMIT may be used to provide data owner JOHN authorization to key label 'PROJECTA-KEY1', which may allow access to content of the container (e.g., data in the clear, etc.). An example command may include:

PERMIT PROJECTA-KEY1 CLASS(CSFKEYS) ID(JOHN) ACCESS(READ)

Additionally, in one embodiment, the data key may be prevented from being used for any purpose other than container encryption by the operating system. This may be accomplished by allowing the security administration to specify an option in the security policy for the data encryption key.

For example, within a z/OS operating system, the RACF command PERMIT may support CRITERIA which may be used to provide data owner MIKE authorization to key label 'PROJECTA-KEY1', which may allow access to content of the container (e.g., data in the clear, etc.), only when the data set is accessed by the access methods. An example command may include:

PERMIT PROJECTA-KEY1 CLASS(CSFKEYS) ID(MIKE) ACCESS(READ) WHEN(CRITERIA(SMS(DSENCRYPTION)))

As shown, user MIKE may only access and use the key label when performing encryption and/or decryption through the given access method via the environment manager.

Further, in one embodiment, a security policy for the container may be enforced such that no one other than a security administrator, including a storage administrator, may change/override the encryption requirement imposed by the security administrator. This may be accomplished by providing system controls such that the security administrator may have complete control over their organization's use of encrypted containers.

For example, the security administrator may specify the key label in the security policy. In addition, an option to disallow the use of any key label from a source other than the security policy may be supported, which may prevent any user not authorized by the security administrator to create an encrypted container.

In another example, within a z/OS operating system, a RACF FACILITY class resource may be used to prevent data sets from being created as encrypted data sets unless authorized to do so. An example command may include (define the following profile in the FACILITY class, and set the universal access to NONE):

STGADMIN.SMS.ALLOW.DATASET.ENCRYPT

Further still, in one embodiment, an environment manager may enable administrators to control configuration of the system in ways that users of the system cannot. One type of enabled administrator may include a security administrator that has authority to manage access to the system and to data. The security administrator may define roles for every user on the system.

Also, in one embodiment, one type of administrator within the system may include a security auditor. For example, if a security administrator modifies a security configuration, including a security policy, those actions may be visible to (and may not be able to be hidden from) the security auditor. The security auditor may observe security controls but may not modify them, and may not necessarily have access to data that users can access.

In addition, in one embodiment, another type of administrator within the system may include a storage administrator. The storage administrator may have authority to manage a storage configuration, but not may not access user data. In another embodiment, the security administrator may establish security policies that storage administrators cannot bypass. In yet another embodiment, a security policy may force data encryption for a container, and security policies may specify the type of encryption used.

Figure 8:
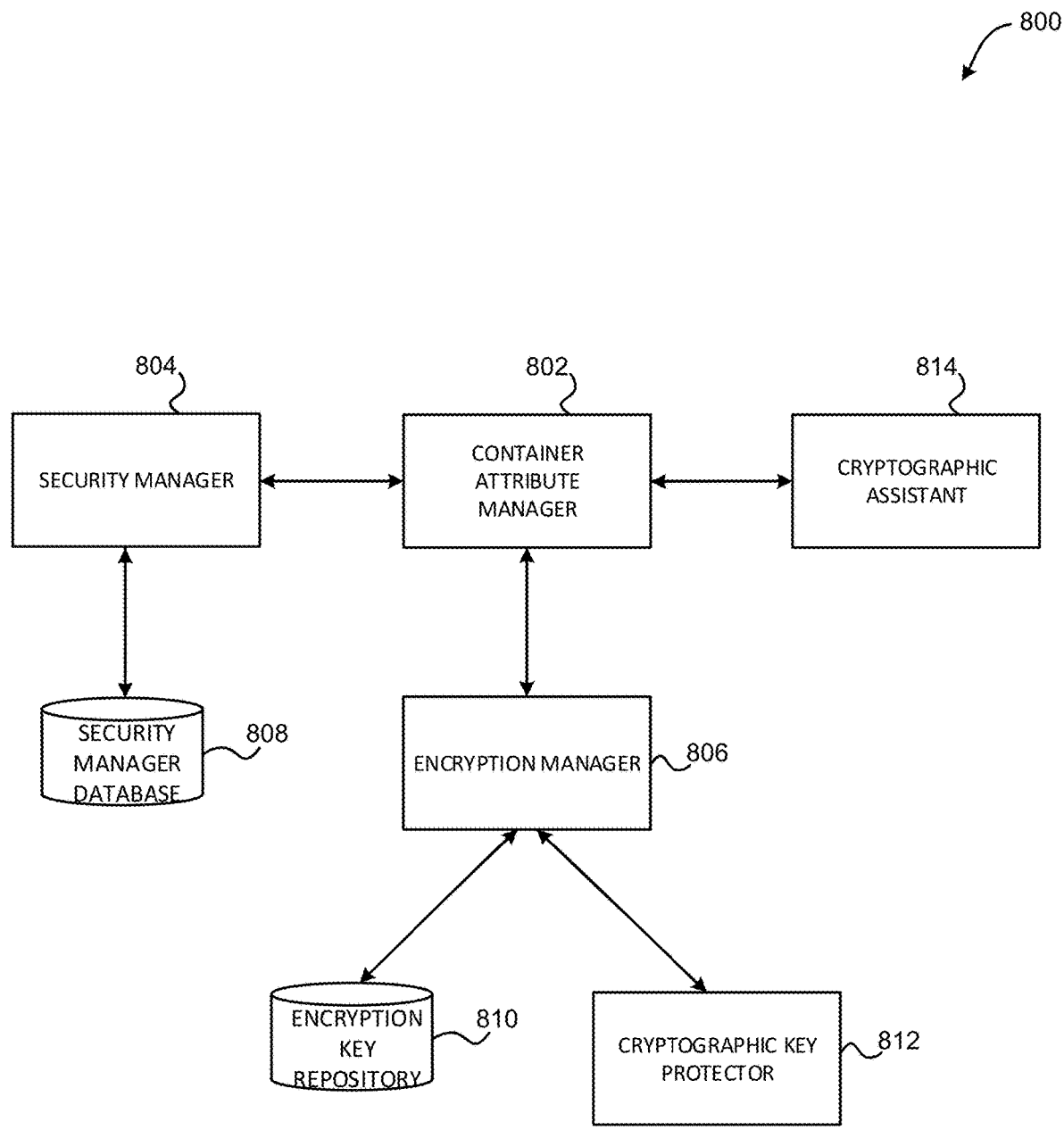
FIG. 8 illustrates an exemplary environment manager data set encryption environment, in accordance with one embodiment.

FIG. 8 illustrates an exemplary environment manager data set encryption environment 800, according to one exemplary embodiment. As shown, the environment 800 includes a container attribute manager 802 that is in communication with a security manager 804, an encryption manager 806, and a cryptographic assistant 814. In one embodiment, the container attribute manager 802 may include an environment manager component such as DFSMS that may assign and manage various attributes for containers so that a system may automatically assume storage management tasks.

Additionally, in one embodiment, the security manager 804 may include a resource access control facility (RACF) that may allow for the definition of security policies, as well as the definition of user authorization. In another embodiment, the security manager 804 may be implemented in middleware, as an external application, or within the environment manager. As shown, the security manager 804 is in communication with a security manager database 808 that stores created security policies.

Further, in one embodiment, the encryption manager 806 may include an integrated cryptographic service facility (ICSF), and may be included as a component within the environment manager. In another embodiment, the encryption manager 806 may provide cryptographic service interfaces (e.g., application programming interfaces (APIs), etc.). As shown, the encryption manager 806 is in communication with an encryption key repository 810 and a cryptographic key protector 812.

Further still, in one embodiment, the encryption manager 806 may control access to the encryption key repository 810. For example, the encryption manager 806 may receive a key label, and may return an encryption key from the encryption key repository 810 that is secured using the cryptographic key protector 812. In another embodiment, the security manager 804 may enforce key usage (e.g., by mandating that a particular encryption key can only be used for container encryption/decryption and not for other types of encryption, etc.). In yet another embodiment, the cryptographic key protector 812 may provide hardware protected, secure-key cryptography. In another embodiment, the encryption key repository 810 may include a database that stores a plurality of different key labels, where each key label is associated with a different, unique data encryption key (e.g., utilizing a pointer, etc.).

Also, in one embodiment, the container attribute manager 802 may receive a key label associated with a container. For example, the key label may be included as metadata of the container. In another example, the container may be encrypted, and the key label may be received from a user or application in response to a request to open the container. In addition, in one embodiment, the container attribute manager 802 may call the security manager 804 to verify the access of the user or application to the container and the key label.

Furthermore, in one embodiment, the security manager 804 may verify the access of the user or application to the container and the key label, and the container attribute manager 802 may then call the encryption manager 806, and send the encryption manager 806 the key label with a request to retrieve the corresponding data encryption key. In response to receiving the key label and the request, the encryption manager 806 may obtain the data encryption key from the encryption key repository 810 and may call the cryptographic key protector 812 to export the data encryption key.

Further still, in one embodiment, the cryptographic key protector 812 may rewrap the retrieved data encryption key as a protected key, and may return the protected key to the encryption manager 806. The encryption manager 806 may send the protected key to the container attribute manager 802, and the container attribute manager 802 may save the protected key in protected virtual storage for future use.

Also, in one embodiment, the container attribute manager 802 may read encrypted data from the container and may invoke the cryptographic assistant 814. The cryptographic assistant 814 may include a CP assist for cryptographic functions (CPACF) and may deliver high-speed on-chip cryptography. In another embodiment, the cryptographic assistant 814 may decrypt the data from the container, utilizing the protected key. The decrypted data may then be sent back to the requesting user/application (e.g., as clear text data, etc.).

In this way, the environment manager may enable the reading of data from an encrypted container, where the environment 800 may perform decryption of the encrypted container in a manner transparent to a requesting user/application. Additionally, data encryption keys may not be exposed to the environment manager during the encryption and decryption.

Additionally, data residing in a container may be encrypted automatically, transparently and immediately at the point of creation without requiring any application coding changes. This may be accomplished by allowing a security administrator to set a security policy that forces a key label for a container during file creation. The system may store the key label as metadata associated with the container. When an application opens the container, the system may obtain the protected data key associated with the key label. The operating system or file system may then use the protected data key for encryption and/or decryption. When the application writes to the container, the system (e.g., file system or access method) may encrypt the data prior to writing to the storage device. Similarly, when the application reads data, the system (file system or access method) may decrypt the data when it is retrieved from the storage device. No application changes may be required, as this processing may be handled transparently within the file system or access method.

As a result, policy based container level encryption may be implemented, which may allow organizations to encrypt data automatically, transparently and immediately at the point of creation without requiring any application coding changes. Furthermore, encryption key policy granularity and separation of duties may be supported by providing the following mechanisms: (1) allowing a key assignment policy which may be tied to the existing security definitions, which may be tied to business requirements; (2) allowing the establishment of a key assignment policy at a level of granularity determined by the security policy (3) enforcing via policy a differentiation between access to the container and access to content; (4) preventing the data key from being used for any purpose other than container encryption by the operating system; and (5) enforcing access rights via policy such that no one, including a storage administrator, can override the encryption requirement imposed by a security administrator.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   identifying a creation of a container within a system;
   selecting a security policy for the container, based on attributes of a user that requested the creation of the container and attributes of an environment associated with the container, including a current security level being implemented within the system and one or more business requirements associated with the system;
   identifying a key label for the security policy for the container;
   cross-referencing the key label at a key repository to obtain a data encryption key; and
   encrypting the container, utilizing the data encryption key.

2. The computer-implemented method of claim 1, wherein the attributes of the user that requested the creation of the container include:
   a name of a user requesting the creation of the container,
   an authorization level of the user,
   an account number of the user,
   a department number of the user, and
   a physical location of the user; and
   the security policy for the container is selected based on attributes of the container including:
   a name of the container,
   a size of the container,
   a type of the container,
   a date that the container was created,
   a location where the container was created, and
   a sensitivity level of the container.

3. The computer-implemented method of claim 1, wherein the attributes of the user that requested the creation of the container include:
   a name of the user that requested the creation of the container,
   an authorization level of the user,
   an account number of the user,
   a department number of the user, and
   a physical location of the user.

4. The computer-implemented method of claim 1, wherein the security policy is selected only if the user associated with the creation of the container has a predetermined security authorization level.

5. The computer-implemented method of claim 1, wherein the security policy is associated with a predetermined type of encryption to be implemented for the container.

6. The computer-implemented method of claim 1, wherein the security policy includes a key label that is associated with a unique, predetermined data encryption key that is used to encrypt the container using one or more encryption procedures.

7. The computer-implemented method of claim 1, wherein the key label is stored as metadata within the container.

8. The computer-implemented method of claim 1, wherein the key label is linked to the security policy for the container and the attributes of the user via one or more pointers.

9. The computer-implemented method of claim 8, wherein the key repository includes a plurality of different key labels, where each key label is associated with a different, unique data encryption key.

10. The computer-implemented method of claim 9, wherein retrieving the data encryption key includes sending a request including the key label to the key repository, and receiving the data encryption key from the key repository in response to the request.

11. The computer-implemented method of claim 1, wherein the security policy is selected based on:
    a location where the container was created,
    a sensitivity level of the container, and
    an authorization level of a user requesting the creation of the container.

12. The computer-implemented method of claim 1, wherein the security policy is selected based on:
    a date that the container was created,
    a location where the container was created, and
    an amount of available storage space within the system.

13. The computer-implemented method of claim 1, wherein the security policy is selected based on:
    a name of a user requesting the creation of the container,
    a current security level being implemented within the system, and
    business requirements associated with the system.

14. A computer program product comprising one or more computer readable storage media, and program instructions collectively stored on the one or more computer readable storage media, the program instructions comprising instructions configured to cause one or more processors to perform a method comprising:
    identifying a creation of a container within a system, utilizing the one or more processors;
    selecting a security policy for the container, based on attributes of a user that requested the creation of the container and attributes of an environment associated with the container, including a current security level being implemented within the system and one or more business requirements associated with the system;
    identifying a key label for the security policy for the container, utilizing the one or more processors;
    cross-referencing, utilizing the one or more processors, the key label at a key repository to obtain a data encryption key; and
    encrypting, utilizing the one or more processors, the container, utilizing the data encryption key.

15. The computer program product of claim 14, wherein an environment manager manages the creation of the container within the system.

16. The computer program product of claim 14, wherein the security policy for the container is selected based on attributes of the container, including:
    a name of the container,
    a size of the container,
    a type of the container,
    a date that the container was created,
    a location where the container was created, and
    a sensitivity level of the container.

17. The computer program product of claim 14, wherein the attributes of the user that requested the creation of the container include:
    a name of the user that requested the creation of the container,
    an authorization level of the user,
    an account number of the user,
    a department number of the user, and
    a physical location of the user.

18. The computer program product of claim 14, wherein the security policy is selected only if the user that requested the creation of the container has a predetermined security authorization level.

19. The computer program product of claim 14, wherein the security policy is associated with a predetermined type of encryption to be implemented for the container.

20. A system, comprising:
a hardware processor; and
logic integrated with the processor, executable by the processor, or integrated with and executable by the processor, the logic being configured to:
identify a creation of a container within a system;
select a security policy for the container, based on attributes of a user that requested the creation of the container and attributes of an environment associated with the container, including a current security level being implemented within the system and one or more business requirements associated with the system;
identify a key label for the security policy for the container;
cross-reference the key label at a key repository to obtain a data encryption key; and
encrypt the container, utilizing the data encryption key.

21. A computer-implemented method, comprising:
identifying a creation of a container within a system;
selecting a security policy for the container, based on:
a location where the container was created,
a sensitivity level of the container, and
an authorization level of a user requesting the creation of the container;
identifying a key label for the security policy for the container;
cross-referencing the key label at a key repository to obtain a data encryption key; and
encrypting the container, utilizing the data encryption key.

22. A computer-implemented method, comprising:
identifying a creation of a container within a system;
selecting a security policy for the container, based on:
a date that the container was created,
a location where the container was created, and
an amount of available storage space within the system;
identifying a key label for the security policy for the container;
cross-referencing the key label at a key repository to obtain a data encryption key; and
encrypting the container, utilizing the data encryption key.

* * * * *